Nov. 29, 1955 W. J. DUNNET 2,725,549

CIRCUIT MEANS FOR SELECTING THE HIGHEST
OR LOWEST OF A PLURALITY OF SIGNALS

Filed May 25, 1954

WITNESSES:

E. A. McCloskey

K. H. Thomas

INVENTOR

Wallace J. Dunnet.

BY Ezra W. Savage

ATTORNEY

United States Patent Office 2,725,549
Patented Nov. 29, 1955

2,725,549

CIRCUIT MEANS FOR SELECTING THE HIGHEST OR LOWEST OF A PLURALITY OF SIGNALS

Wallace J. Dunnet, Newtonville, Mass., assignor to Westinghouse Electric Corporation, East Pittsburgh, Pa., a corporation of Pennsylvania Application May 25, 1954, Serial No. 432,133
7 Claims. (Cl. 340—172)

This invention relates to auctioneering circuits and, more particularly, to auctioneering circuits of the magnetic amplifier type.

An auctioneering circuit is defined herein as circuit means utilized to select the highest or the lowest of a plurality of separate control signals and supply energy to a load in accordance with the selected control signal. In many of the prior art auctioneering circuits, the performance of the circuit is substantially affected by changes in the magnitude of the impedance in the various control circuits associated with the auctioneering circuit.

An object of this invention is to provide a magnetic amplifier type of auctioneering circuit for selecting one of a plurality of separate control signals and for supplying energy to a load in accordance with the selected control signal, by so interconnecting the load with a supply voltage and with a plurality of load windings, each of which is associated with a magnetic core member, that when one of the magnetic core members saturates, energy is supplied to the load in accordance with the control signal associated with the saturated magnetic core member.

Another object of this invention is to provide an auctioneering circuit which accurately selects one of a plurality of separate control signals.

A further object of this invention is to provide an auctioneering circuit whose circuit performance is relatively independent of changes in the impedance of the various input control circuits.

A still further object of this invention is to provide an auctioneering circuit which auctioneers control signals of small magnitude and which has a substantially linear output.

Other object of this invention will become apparent from the following description when taken in conjunction with the accompanying drawing, in which.

Figure 1:
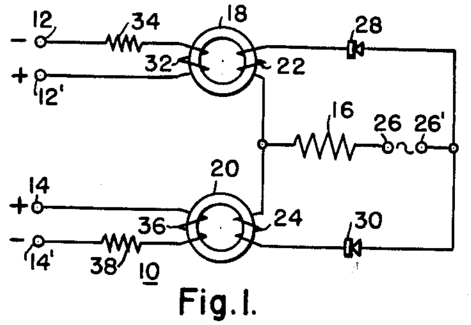
Figure 1 is a schematic diagram of a half-wave auctioneering circuit which selects the lowest of a plurality of separate control signals.

Referring to Fig. 1, there is shown a half-wave magnetic amplifier type auctioneering circuit 10 illustrating this invention. The auctioneering circuit 10 selects the lowest of a plurality of separate direct-current control signals, specifically voltages, as applied to the terminals 12 and 12', and 14 and 14', and supplies energy to a load 16 in accordance with the selected control signal.

In general, the auctioneering circuit 10 comprises magnetic core members 18 and 20. In order to drive both of the magnetic core members 18 and 20 toward saturation, during alternate half-cycles of an alternating-current supply voltage, load windings 22 and 24 are disposed in inductive relationship with the magnetic core members 18 and 20, respectively. Specifically, two parallel connected series circuits are interconnected with the load 16 and connected to be energized by the alternating-current supply voltage which is applied to supply terminals 26 and 26'.

One of the parallel connected series circuits includes a self-saturating rectifier 28 and the load winding 22. On the other hand, the other parallel connected series circuit includes a self-saturating rectifier 30 and the load winding 24. The function of the self-saturating rectifiers 28 and 30 is to permit the flow of current in only one direction through the load windings 22 and 24, respectively.

In order to drive the magnetic core member 18 away from saturation during the other alternate half-cycles of the alternating-current supply voltage, to a flux level, as determined by the control ampere-turns applied to the magnetic core member 18, a control winding 32 is disposed in inductive relationship with the magnetic core member 18. In particular, the control winding 32 is connected in series circuit relationship with a control resistor 34, the series circuit being connected to the control terminals 12 and 12'. In operation, the control resistor 34 functions to reduce the current, in the control circuit in which it is disposed, induced by the alternating supply voltage driving core member 18 to saturation.

In like manner, in order to drive the magnetic core member 20 away from saturation and reset the flux level in the magnetic core member 20 to a predetermined value, as determined by the control ampere-turns applied to the magnetic core member 20, a control winding 36 is disposed in inductive relationship with the magnetic core member 20. Specifically, the control winding 36 is connected in series circuit relationship with a control resistor 38, the series circuit being connected to the control terminals 14 and 14'. In operation, the control resistor 38 functions to reduce the current, in the control circuit in which it is disposed, induced by the alternating supply voltage driving core member 20 to saturation.

For the purpose of simplifying the description of the auctioneering circuit 10, it is assumed that the control winding 32 has the same number of turns as the control winding 36, that the load winding 22 has the same number of turns as the load winding 24, and that the other corresponding parts, such as the resistors 34 and 38, have the same value. Under such conditions, the auctioneering circuit 10 auctioneers the lowest of the direct-current control voltages as applied to the terminals 12 and 12', and 14 and 14'.

If the turns of the control winding 32 were not equal to the turns of the control winding 36, then the average voltage across the load 16 would not necessary be in accordance with the lowest of the direct-current control voltages, as applied to the terminals 12 and 12', and 14 and 14'. However, whether the number of turns of the control windings 32 and 36 are of equal value or not, the average voltage across the load 16, for one cycle of the supply voltage, as applied to the terminals 26 and 26', is in accordance with the ampere-turns of the control winding, 32 or 36, which is associated with the magnetic core member, 18 or 20, which first saturates.

The operation of the auctioneering circuit 10 will now be described. Assuming the magnitude of the direct-current control voltage applied to the terminals 12 and 12' is of lower magnitude than the direct-current control voltage applied to the terminals 14 and 14', then the magnetic core member 18 is not reset to as low a flux level as is the magnetic core member 20. This resetting of the flux level in the magnetic core members 18 and 20 occurs when the supply terminal 26 is at a positive polarity with respect to the supply terminal 26'. During this half-cycle of the supply voltage, the rectifiers 28 and 30 prevent the flow of current through the load windings 22 and 24, respectively, thus preventing the magnetic core members 18 and 20 from being driven away from saturation by the action of current flow through the load windings 22 and 24, thus permitting the control windings 32 and 36 to effect a resetting of the flux level in the magnetic core members 18 and 20, respectively.

During the next half-cycle of the alternating-current supply voltage, when the terminal 26' is at a positive polarity with respect to the terminal 26, exciting current flows simultaneously through the load windings 22 and 24, to thereby drive the magnetic core members 18 and 20 toward saturation until one of them saturates. In particular, exciting current flows from the supply terminal 26' through the self-saturating rectifier 28, the load winding 22, and the load 16, to the supply terminal 26. During this same half-cycle of the operation, current also flows from the supply terminal 26' through the self-saturating rectifier 30, the load winding 24, and the load 16, to the supply terminal 26.

During the half-cycle of the operation, when the supply terminal 26' is at a positive polarity with respect to the supply terminal 26, exciting current continues to flow through the load windings 22 and 24 until either the magnetic core member 18 or the magnetic core member 20 saturates. Since it was assumed that the direct-current control voltage applied to the terminals 12 and 12' was of lower magnitude than the direct-current control voltage applied to the terminals 14 and 14', the magnetic core member 18 saturates. When the magnetic core member 18 substantially completely saturates, load current flows through the load 16 and the voltage across the load winding 22 decreases to substantially zero magnitude, and substantially all of the supply voltage appears across the load 16. Thus, the voltage across the series circuit including the load 16 and the supply terminals 26 and 26' decreases to zero magnitude, and, therefore, the voltage across the load winding 24, which is connected across this series circuit, likewise decreases to substantially zero magnitude. Since the voltage across the load winding 24 decreases to zero magnitude, the magnetic core member 20 does not saturate, and, therefore, the average voltage across the load 16, for one cycle of the supply voltage as applied to the terminals 26 and 26', is in accordance with the magnitude of the control voltage as applied to the terminals 12 and 12'.

Assuming that during the next cycle of the supply voltage the direct-current control voltage applied to the terminals 14 and 14' is of lower magnitude than the direct-current control voltage applied to the terminals 12 and 12', then the magnetic core member 18 is reset to a lower flux level than is the magnetic core member 20. Of course, this resetting operation takes place when the supply terminal 26 is at a positive polarity with respect to the supply terminal 26'.

During the next half-cycle of the operation, when the supply terminal 26' is at a positive polarity with respect to the supply terminal 26, exciting current flows through the load windings 22 and 24. Since the control voltage applied to the terminals 14 and 14' is of lower magnitude than the control voltage applied to the terminals 12 and 12', the magnetic core member 20 saturates. When the magnetic core member 20 substantially completely saturates, load current flows through the load 16 and the voltage across the load winding 24 decreases to substantially zero magnitude, and substantially all of the supply voltage appears across the load 16. Thus, the voltage across the series circuit including the load 16 and the supply terminals 26 and 26' decreases to substantially zero magnitude, and the voltage across the load winding 22 likewise decreases to substantially zero magnitude. Therefore, the average voltage across the load 16, for one cycle of the supply voltage as applied to the terminals 26 and 26', is in accordance with the direct-current control voltage as applied to the terminals 14 and 14'.

Figure 2:
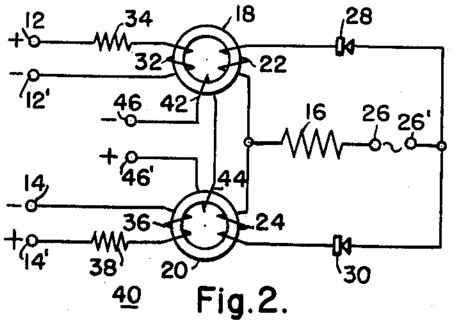
Fig. 2 is a schematic diagram of a half-wave auctioneering circuit which selects the highest of a plurality of control signals.

Referring to Fig. 2, there is illustrated another embodiment of this invention in which like components of Figs. 1 and 2 have been given the same reference characters. The main distinction between the auctioneering circuit 40 of Fig. 2 and the auctioneering circuit 10 of Fig. 1 is that the auctioneering circuit 40 selects the highest of two direct-current control voltages, as applied to the terminals 12 and 12', and 14 and 14', and supplies energy to the load 16 in accordance with the selected control voltage. This is accomplished by disposing biasing windings 42 and 44 in inductive relationship with the magnetic core members 18 and 20, respectively. As illustrated, the biasing windings 42 and 44 are connected to be energized in accordance with a direct-current biasing voltage, as applied to terminals 46 and 46'.

In the auctioneering circuit 40, the polarity of the direct-current control voltages, as applied to the terminals 12 and 12', and 14 and 14', is reversed from that polarity, as shown in Fig. 1. Thus, in operation, the action of the control windings 32 and 36 opposes the action of their respective biasing windings 42 and 44. However, the action of the biasing windings 42 and 44 opposes the action of their respective load windings 22 and 24, and thus biases the respective magnetic core members 18 and 20 away from saturation. Therefore, the action of the control windings 32 and 36 is such as to drive their respective magnetic core members 18 and 20 toward saturation.

The operation of the auctioneering circuit 40 will now be described. When the supply terminal 26 is at a positive polarity, with respect to the supply terminal 26', current is prevented from flowing through the load windings 22 and 24 by the self-saturating rectifiers 28 and 30, respectively. During this same half-cycle of the operation, the current flow through the biasing windings 42 and 44 drives the respective magnetic core members 18 and 20 away from saturation. However, the magnitude of the current flow through the control windings 32 and 36 determines the flux level to which the magnetic core members 18 and 20, respectively, are reset. Since the control windings 32 and 36 oppose the action of their respective biasing windings 42 and 44, the larger of the two control voltages, as applied to the control terminals 12 and 12', and 14 and 14', effects a smaller resetting of its associated magnetic core member.

During the next half-cycle of the operation, when the supply terminal 26' is at a positive polarity, with respect to the supply terminal 26, exciting current flows through the load windings 22 and 24 and through the load 16 until one of the magnetic core members 18 or 20 saturates. If it is assumed that the direct-current control voltage applied to the terminals 12 and 12' is of greater magnitude than the direct-current control voltage applied to the terminals 14 and 14', then the magnetic core member 18 will saturate. When the magnetic core member 18 substantially completely saturates, load current flows through the load 16 and the voltage across the load winding 22 decreases to substantially zero magnitude. This action decreases the magnitude of the voltage across the series circuit, including the load 16 and the supply terminals 26 and 26', to substantially zero. Thus, the voltage across the load winding 24 is, likewise, decreased to substantially zero magnitude. Therefore, the magnetic core member 20 does not saturate and the average voltage across the load 16, for one cycle of the supply voltage, as applied to the terminals 26 and 26', is in accordance with the direct-current control voltage as applied to the terminals 12 and 12'.

On the other hand, if it is assumed that the magnitude of the direct-current control voltage applied to the terminals 14 and 14' is greater than the magnitude of the direct-current control voltage applied to the terminals 12 and 12', then the magnetic core member 20 saturates, and the average voltage across the load 16 for one cycle of the supply voltage is in accordance with the direct-current control voltage as applied to the terminals 14 and 14'.

Figure 3:
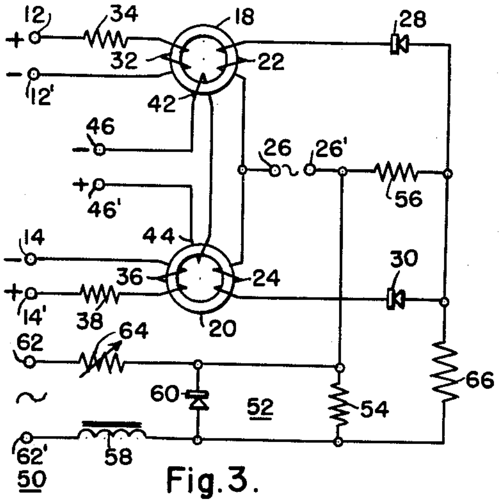
Fig. 3 is a schematic diagram of a half-wave auctioneering circuit which is capable of auctioneering control signals of small magnitude and which has a substantially linear output.

Referring to Fig. 3, there is illustrated an auctioneering circuit 50 which is capable of auctioneering control signals of relatively low magnitude and which has a substantially linear output for both small and large values of control signals. The main distinction between the auctioneering circuit 40 of Fig. 2 and the auctioneering circuit 50 of Fig. 3 is that a bucking circuit 52 is provided for producing a voltage that opposes the voltage produced across a resistor 56. In order to simplify the description, like components of the auctioneering circuits 40 and 50 have been given the same reference characters.

The bucking circuit 52 comprises an impedance member, specifically a resistor 54, which is connected in series circuit relationship with the other impedance member, specifically the resistor 56, which is interconnected in the same manner as the load 16 of Fig. 2. In order to produce a voltage across the resistor 54 that is of a similar wave shape to the voltage developed across the resistor 56 by the flow of current therethrough, a saturating reactor 58 is provided. Since the exciting current only produces a voltage across the resistor 56 during alternate half-cycles of the supply voltage, as applied to the terminals 26 and 26', a corresponding bucking voltage should only be produced across the resistor 54 during the same alternate half-cycles of the supply voltage. Therefore, a rectifier 60 is connected in paralell circuit relationship with the resistor 54. Thus, with an alternating-current reference voltage applied to terminals 62 and 62', and with the terminal 62 at a positive polarity, with respect to the terminal 62', current flows from the terminal 62 through a voltage adjusting resistor 64, the resistor 64 and the saturating reactor 58 to the terminal 62'. However, during the next half-cycle of the alternating-current voltage, as applied to the terminals 62 and 62', the rectifier 60 by-passes substantially all the current, and substantially no voltage appears across the resistor 54.

In practice, the alternating-current voltages applied to the terminals 26 and 26' and to the terminals 62 and 62' must be properly co-ordinated in order to produce the proper result. That is, when the terminal 26' is at a positive polarity, with respect to the terminal 26, the terminal 62 must be at a positive polarity with respect to the terminal 62'.

Figure 4:
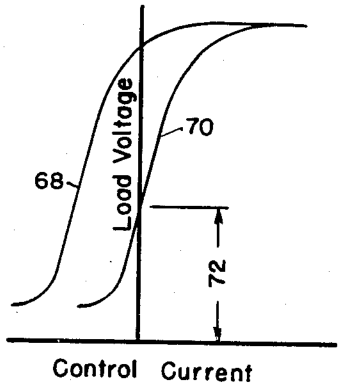
Fig. 4 is a graph, the curves of which illustrate the manner in which the auctioneering circuit of Fig. 3 functions.

As illustrated, a load 66 is connected across the series circuit including the resistors 54 and 56. In operation, the magnitude of the voltage across the load 66 is substantially zero when the magnitude of the direct-current control voltages is zero. This can more clearly be seen by referring to Fig. 4 in which a curve 68 represents the transfer characteristics for the auctioneering circuit 50 when the bucking circuit 52 is not provided and the biasing windings 42 and 44 are not connected to be energized. However, when the biasing windings 42 and 44 are energized during the operation of the auctioneering circuit 50 and the bucking circuit 52 is not provided, the transfer characteristic of the auctioneering circuit 50 is as represented by a curve 70. On the other hand, the bucking voltage produced by the bucking circuit 52 is represented at 72. Thus, as can be seen from the transfer curve 70, with the provision of the bucking circuit 52, the voltage across the load 66 is of substantially zero magnitude when the direct-current control currents are of zero magnitude. In addition, as can be seen from the curve 70, the output voltage across the load 66 is linear for low magnitudes of direct-current control voltage as applied to the terminals 12 and 12', and 14 and 14'. In other words, by providing the bucking circuit 52, the transfer curve 70 is shifted downward an amount, as represented at 72.

Figure 5:
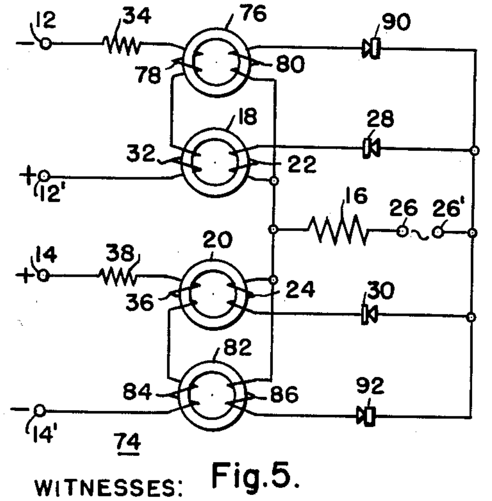
Fig. 5 is a schematic diagram of a full-wave auctioneering circuit which selects the lowest of a plurality of control signals.

Referring to Fig. 5, there is illustrated a full-wave auctioneering circuit 74 in which like components of Figs. 1 and 5 have been given the same reference characters. The main distinction between the apparatus of Figs. 1 and 5 is that in the apparatus of Fig. 5 components have been added in order that a full-wave alternating-current output is produced across the load 16 in accordance with the lowest of the direct-current control voltages applied to the terminals 12 and 12', and 14 and 14'.

As illustrated, the auctioneering circuit 74 comprises a magnetic core member 76 which has disposed in inductive relationship therewith a control winding 78 and a load winding 80; and a magnetic core member 82 which has disposed in inductive relationship therewith a control winding 84 and a load winding 86. In order to permit the flow of current in only one direction through the load winding 80, a self-saturating rectifier 90 is connected in series circuit relationship therewith. In like manner, in order to permit the flow of current in only one direction through the load winding 86, a self-saturating rectifier 92 is connected in series circuit relationship therewith. As illustrated, the series circuit including the load winding 80 and the self-saturating rectifier 90 and the series circuit including the load winding 86 and the self-saturating rectifier 92, are connected in parallel circuit relationship with the other two series circuits which include first, the load winding 22 and the self-saturating recitfier 28, and second, the load winding 24 and the self-saturating rectifier 30.

In this instance, the control windings 32 and 78 are connected in series circuit relationship with one another and with the control resistor 34, the series circuit being connected to the control terminals 12 and 12'. In like manner, the control windings 36 and 84 are connected in series circuit relationship with one another and with the control resistor 38, this series circuit being connected to the control terminals 14 and 14'. In practice, the control windings 78 and 84 are so disposed on their respective magnetic core members 76 and 82 that current flow through the control windings 78 and 84 effects a resetting of the flux level in the respective magnetic core members 76 and 82. On the other hand, the load windings 80 and 86 are so disposed on their magnetic core members 76 and 82 that current flow therethrough effects a driving of the respective magnetic core members towards saturation.

The operation of the auctioneering circuit 74 will now be described. When the supply terminal 26 is at a positive polarity with respect to the supply terminal 26', exciting current flows from the terminal 26 through the load 16, the load winding 80, and the self-saturating rectifier 90 to the supply terminal 26'. Exciting current also flows simultaneously through the series circuit including the load winding 86 and the self-saturating rectifier 92. If it is assumed that the direct-current control voltage applied to the terminals 12 and 12' is of lower magnitude than the direct-current control voltage applied to the terminals 14 and 14', then the magnetic core member 76 will saturate. The reason for this is that with the direct-current control voltage applied to the terminals 12 and 12' of lower magnitude than the direct-current control voltage applied to the terminals 14 and 14', the magnetic core member 76 is reset to a higher flux level than the magnetic core member 82 during the previous half-cycle of operation.

Once the magnetic core member 76 substantially completely saturates, load current flows through the load 16 and the voltage across the load winding 80 decreases to substantially zero magnitude, and substantially all of the supply voltage appears across the load 16. This, in turn, decreases the magnitude of the voltage across the series circuit, including the load 16 and supply terminals 26 and 26′, to zero magnitude and thus decreases the voltage across the load winding 86 to substantially zero magnitude. Therefore, the magnetic core member 82 does not saturate.

During the half-cycle of the operation when the supply terminal 26 is at a positive polarity, with respect to the supply terminal 26′, the magnetic core members 18 and 20 are reset to a flux level as determined by the magnitudes of the direct-current control voltages applied to the terminals 12 and 12′, and 14 and 14′, respectively. However, during the half-cycle of operation, when the supply terminal 26′ is at a positive polarity with respect to the supply terminal 26, exciting current flows through the load windings 22 and 24. Since it was assumed that the direct-current control voltage applied to the control terminals 12 and 12′ was of lower magnitude than the direct-current control voltage applied to the terminals 14 and 14′, the exciting current flowing through the winding 22 effects a substantially complete magnetic saturation of the magnetic core member 18. The reason for this is that the magnetic core member 18, under the assumed conditions, was reset during the previous half-cycle of operation to a higher flux level than the magnetic core member 20.

When the magnetic core member 18 substantially completely saturates, load current flows through the load 16 and the voltage across the load winding 22 decreases to substantially zero magnitude. When the voltage across the load winding 22 decreases to substantially zero magnitude, the voltage across the load winding 24, likewise, decreases to substantially zero magnitude, and, therefore, the magnetic core member 20 does not saturate. Therefore, again the average alternating-current voltage across the load 16 is in accordance with the direct-current control voltage, as applied to the terminals 12 and 12′.

On the other hand, if the magnitude of the direct-current control voltage applied to the terminals 14 and 14′ is lower than the magnitude of the direct-current control voltage applied to the terminals 12 and 12′, for a particular cycle of the supply voltage, then the average alternating-current voltage across the load 16 is in accordance with the control voltage, as applied to the terminals 14 and 14′ for that cycle. Since the operation under such assumed conditions, except for the flux level to which each of the magnetic core members 18, 20, 76, and 82 is reset and thus which core member saturates, is so similar to the operation previously described for the auctioneering circuit 74, a further description of such operation is deemed unnecessary.

Figure 6:
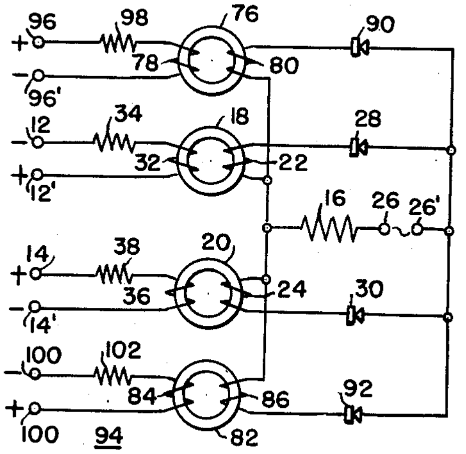
Fig. 6 is a schematic diagram of a half-wave auctioneering circuit which selects the lowest of four separate control signals.

Referring to Fig. 6, there is illustrated another half-wave auctioneering circuit 94 which is capable of selecting the lowest of four direct-current control signals and supplying energy to the load 16 in accordance with the selected control signal. In order to simplify the description, like components of Figs. 1, 5 and 6 have been given the same reference characters.

The main distinction between the apparatus of Figs. 5 and 6 is that in the apparatus of Fig. 6, four input signals are auctioneered and a half-wave direct-current output signal is obtained, while in Fig. 5 two input signals are auctioneered and an alternating-current output signal is obtained. In particular, the self-saturating rectifiers 90 and 92 have been poled oppositely from the self-saturating rectifiers 90 and 92 of the apparatus of Fig. 5. By so poling the self-saturating rectifiers 90 and 92 as illustrated in Fig. 6, exciting current simultaneously flows through the load windings 22, 24, 80 and 86 when the supply terminal 26′ is at a positive polarity with respect to the supply terminal 26.

As illustrated, the control winding 78 is connected to be energized by a direct-current control voltage, as applied to control terminals 96 and 96′. A control resistor 98, corresponding to the control resistor 34, is connected in series circuit relationship with the control winding 78.

In like manner, the control winding 84 is connected to be energized by a direct-current control voltage, as applied to control terminals 100 and 100′. A control resistor 102, corresponding to the control resistor 38, is connected in series circuit relationship with the control winding 84.

In operation, with the supply terminal 26′ at a positive polarity with respect to the supply terminal 26, exciting current flows through the load windings 22, 24, 80, and 86 until one of the magnetic core members 18, 20, 76, or 82 substantially completely saturates. If it is assumed that the lowest direct-current control voltage is applied to the terminals 12 and 12′, then the magnetic core member 18 saturates. When the magnetic core member 18 saturates, the magnitude of the voltage across the load winding 22 decreases to substantially zero and substantially all of the supply voltage appears across the load 16. Therefore, the voltage across the load windings 24, 80, and 86, likewise, decreases to substantially zero magnitude, and, thus the magnetic core members 20, 76, and 82 do not saturate. Under such conditions, the average voltage across the load 16, for one cycle of the supply voltage, as applied to the supply terminals 26 and 26′, is in accordance with the direct-current control voltage, as applied to the terminals 12 and 12′.

Thus, the operation of the auctioneering circuit 94 is such that when the supply terminal 26′ is at a positive polarity, with respect to the supply terminal 26, exciting current flows through the load windings 22, 24, 80, and 86 to thereby effect a substantially complete magnetic saturation of the magnetic core member that has been reset to the highest flux level, as determined by the magnitude of the direct-current control voltages as applied to the control terminals 96 and 96′, 12 and 12′, 14 and 14′, and 100 and 100′. The resetting of the flux level in the magnetic core members 18, 20, 76, and 82 takes place during the previous half-cycle of the operation when the supply terminal 26 is at a positive polarity with respect to the supply terminal 26′.

It is to be understood that direct-current output can be obtained from the full-wave auctioneering circuit 70 of Fig. 5 by substituting, as is well known in the art, a full-wave rectifier (not shown) for the load 16, and then connecting the load 16 to the output of the full-wave rectifier (not shown). It is also to be understood that the auctioneering circuits hereinbefore described can auctioneer alternating-current control signals by properly inserting rectifiers (not shown) in the various control circuits.

It is also to be understood that this invention is not limited to auctioneering circuits that auctioneer 2 or 4 control signals, but rather is applicable to circuits which auctioneer two or more control signals.

The apparatus embodying the teachings of this invention has several advantages. For instance, the auctioneering circuits described herein have a high degree of accuracy in selecting a particular control signal. In addition, the performance of each of the auctioneering circuits described herein is relatively independent of the magnitude of the various control signal source impedances. Further, the auctioneering circuit 50 of Fig. 3 auctioneers control signals of relatively small magnitude and has a substantially linear output across the load 66 for both small and large values of control signals as applied to the control terminals 12 and 12′, and 14 and 14′.

Since certain changes may be made in the above apparatus and circuits and different embodiments of the invention could be made without departing from the scope thereof, it is intended that all matter contained in the above description or shown in the accompanying drawing shall be interpreted as illustrative and not in a limiting sense.

I claim as my invention:

1. In an auctioneering circuit for selecting one of a plurality of separate control signals and for supplying energy to a load in accordance with the selected control signal, the combination comprising, a plurality of magnetic core members, a control winding disposed in inductive relationship with each of the magnetic core members, the control windings being connected to be energized by said separate control signals, a load winding disposed in inductive relationship with each of the magnetic core members, two parallel connected circuits, one of the parallel connected circuits including one of the load windings and a rectifier and the other of the parallel connected circuits including another of the load windings and another rectifier, thereby permitting the flow of current in only one direction through the load windings, the two parallel connected circuits being interconnected with the load and connected to be energized by an alternating-current supply voltage, whereby once one of the magnetic core members saturates the average voltage across the load for one cycle of the alternating-current supply voltage is in accordance with the ampere-turns of the control winding of said one of the magnetic core members.

2. In an auctioneering circuit for selecting one of a plurality of separate control signals and for supplying energy to a load in accordance with the selected control signal, the combination comprising, two magnetic core members, a load winding disposed in inductive relationship with each of the magnetic core members, two parallel connected circuits, one of the parallel connected circuits including one of the load windings and a rectifier, and the other of the parallel connected circuits including the other of the load windings and another rectifier, the two parallel connected circuits being interconnected with the load and connected to be energized by an alternating-current supply voltage, to thereby drive each of the magnetic core members towards saturation during alternate half-cycles of the alternating-current supply voltage, and a control winding disposed in inductive relationship with each of the magnetic core members, each of the control windings being connected to be energized by one of said separate control signals, to thereby drive the respective magnetic core members away from saturation during the other alternate half-cycles of the alternating-current supply voltage to thus determine the flux level to which each of the magnetic core members is reset, whereby once one of the magnetic core members is driven to saturation by the alternating-current supply voltage, the average voltage across the load for one cycle of the alternating-current supply voltage is in accordance with the ampere-turns of the control winding of said one of the magnetic core members.

3. In an auctioneering circuit for selecting one of a plurality of separate control signals and for supplying energy to a load in accordance with the selected control signal, the combination comprising, two magnetic core members, a load winding disposed in inductive relationship with each of the magnetic core members, two parallel connected circuits, one of the parallel connected circuits including one of the load windings and a rectifier, and the other of the parallel connected circuits including the other of the load windings and another rectifier, the two parallel connected circuits being interconnected with the load and connected to be energized by an alternating-current supply voltage, a biasing winding disposed in inductive relationship with each of the magnetic core members, the biasing windings being so disposed on each of the magnetic core members and so responsive to a biasing voltage as to oppose the action of the respective load windings, and a control winding disposed in inductive relationship with each of the magnetic core members, the control windings being connected to be responsive to said separate control signals and so disposed as to oppose the action of their respective biasing windings to thus effect a driving of the respective magnetic core members toward saturation, whereby once one of the magnetic core members is driven to saturation by its associated separate control signal, the average voltage across the load for one cycle of the alternating-current supply voltage is in accordance with the ampere-turns of the control winding of said one of the magnetic core members.

4. In an auctioneering circuit for selecting one of a plurality of separate control signals and for supplying energy to a load in accordance with the selected control signal, the combination comprising, two magnetic core members, a load winding disposed in inductive relationship with each of the magnetic core members, two parallel connected circuits, one of the parallel connected circuits including one of the load windings, and the other of the parallel connected circuits including the other of the load windings, an impedance member, the two parallel connected circuits being interconnected with the impedance member and connected to be energized by an alternating-current supply voltage, a biasing winding disposed in inductive relationship with each of the magnetic core members, the biasing windings being so disposed on each of the magnetic core members and so responsive to a biasing voltage as to oppose the action of the respective load windings, a control winding disposed in inductive relationship with each of the magnetic core members, the control windings being connected to be responsive to said separate control signals and so disposed as to oppose the action of their respective biasing windings to thus effect a driving of the respective magnetic core members toward saturation, another impedance member, said another impedance member and said impedance member being connected in series circuit relationship with one another and the load being connected across the series circuit, and circuit means interconnected with the said another impedance member for applying thereto a voltage of substantially equal magnitude and opposite polarity to the voltage appearing across the said impedance member when the said separate control signals are of zero magnitude, whereby once one of the magnetic core members is driven to saturation by its associated separate control signal, the average voltage across the load for one cycle of the alternating-current supply voltage is in accordance with the ampere-turns of the control winding of said one of the magnetic core members.

5. In an auctioneering circuit for selecting one of a plurality of separate control signals and for supplying energy to a load in accordance with the selected control signal, the combination comprising, two magnetic core members, a load winding disposed in inductive relationship with each of the magnetic core members, two parallel connected circuits, one of the parallel connected circuits including one of the load windings and a rectifier, and the other of the parallel connected circuits including the other of the load windings and another rectifier, to thus permit current to flow in only one direction through the load windings, an impedance member, the two parallel connected circuits being interconnected with the impedance member and connected to be energized by an alternating-current supply voltage, a biasing winding disposed in inductive relationship with each of the magnetic core members, the biasing windings being so disposed on each of the magnetic core members and so responsive to a biasing voltage as to oppose the action of the respective load windings, a control winding disposed in inductive relationship with each of the magnetic core members, the control windings being connected to be responsive to said separate control signals and so disposed as to oppose the action of their respective biasing windings to thus effect a driving of the respective magnetic core members toward saturation, another impedance member, said another impedance member and said impedance member being connected in series circuit relationship with one another and the load being connected across the series circuit, and circuit means interconnected with the said another impedance member for applying thereto a voltage of substantially equal magnitude and opposite polarity to the voltage appearing across the said impedance member when the said separate control signals are of zero magnitude, said circuit means including rectifier means for permitting current to flow through the said another impedance member only during alternate half-cycles of an alternating-current reference voltage, and a saturating reactor for obtaining the desired voltage wave shape across the said another impedance member during said alternate half-cycles of the reference voltage.

6. In an auctioneering circuit for selecting one of a plurality of separate control signals and for supplying energy to a load in accordance with the selected control signal, the combination comprising, two magnetic core members, a load winding disposed in inductive relationship with each of the magnetic core members, two parallel connected circuits, one of the parallel connected circuits including one of the load windings, and the other of the parallel connected circuits including the other of the load windings, an impedance member, the two parallel connected circuits being interconnected with the impedance member and connected to be energized by an alternating-current supply voltage, a biasing winding disposed in inductive relationship with each of the magnetic core members, the biasing windings being so disposed on each of the magnetic core members and so responsive to a biasing voltage as to oppose the action of the respective load windings, a control winding disposed in inductive relationship with each of the magnetic core members, the control windings being connected to be responsive to said separate control signals and so disposed as to oppose the action of their respective biasing windings to thus effect a driving of the respective magnetic core members toward saturation, another impedance member, said another impedance member and said impedance member being connected in series circuit relationship with one another and the load being connected across the series circuit, and circuit means interconnected with the said another impedance member for applying thereto a voltage of substantially equal magnitude and opposite polarity to the voltage appearing across the said impedance member when the said separate control signals are of zero magnitude, said circuit means including rectifier means for permitting current to flow through the said another impedance member only during alternate half-cycles of an alternating-current reference voltage, and a saturating reactor for obtaining the desired voltage wave shape across the said another impedance member during said alternate half-cycles of the reference voltage.

7. In an auctioneering circuit for selecting one of a plurality of separate control signals and for supplying energy to a load in accordance with the selected control signal, the combination comprising, four magnetic core members, a control winding disposed in inductive relationship with each of the magnetic core members, two of the control windings being connected to be energized by one of the separate control signals, and the other two control windings being connected to be energized by another of the separate control signals, a load winding disposed in inductive relationship with each of the magnetic core members, a rectifier connected in series circuit relationship with each of the load windings and each of the series circuits being connected in parallel circuit relationship with one another, the parallel connected series circuits being interconnected with the load and connected to be responsive to an alternating-current supply voltage, to thereby effect, during alternate half-cycles of said supply voltage, a flow of current through one of the load windings associated with said two of the control windings and through one of the load windings associated with said other two control windings, and during the other alternate half-cycles of the said supply voltage, a flow of current through the other two load windings, whereby once one of the magnetic core members saturates the average voltage across the load for one cycle of the said supply voltage is in accordance with the ampere-turns of the control winding of said one of the magnetic core members.

References Cited in the file of this patent

UNITED STATES PATENTS

| | | |
|---|---|---|
| 2,021,099 | Fitz Gerald | Nov. 12, 1935 |
| 2,456,499 | Fritzinger | Dec. 14, 1948 |
| 2,652,555 | Smith | Sept. 15, 1953 |
| 2,675,538 | Malthaner | Apr. 13, 1954 |